(12) United States Patent
Itakura

(10) Patent No.: US 12,061,737 B2
(45) Date of Patent: Aug. 13, 2024

(54) IMAGE PROCESSING APPARATUS, IMAGE PROCESSING METHOD, AND STORAGE DEVICE

(71) Applicant: CANON KABUSHIKI KAISHA, Tokyo (JP)

(72) Inventor: Kina Itakura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/315,539

(22) Filed: May 11, 2023

(65) Prior Publication Data

US 2023/0376109 A1    Nov. 23, 2023

(30) Foreign Application Priority Data

May 23, 2022   (JP) ................. 2022-083808

(51) Int. Cl.
*G06F 3/01*    (2006.01)
*G06T 11/00*   (2006.01)

(52) U.S. Cl.
CPC .............. *G06F 3/013* (2013.01); *G06T 11/00* (2013.01)

(58) Field of Classification Search
CPC .......... G06F 3/011; G06F 3/012; G06F 3/013; G06T 11/00
See application file for complete search history.

(56) References Cited

U.S. PATENT DOCUMENTS

2020/0393683 A1* 12/2020 Matsuoka ............ G02B 27/017
2022/0326766 A1* 10/2022 Spencer ................ G06F 3/013
2023/0360316 A1* 11/2023 Shimizu ................ G06F 3/013

OTHER PUBLICATIONS

"Camera render position" to "Varjo", search date: Apr. 22, 2022, retrieved from: https://developer.varjo.com/docs/get-started/camera-render-position (5 pages).

* cited by examiner

*Primary Examiner* — Nelson M Rosario
(74) *Attorney, Agent, or Firm* — Venable LLP

(57) ABSTRACT

An image processing apparatus displaying an image of an appearance of a virtual object from a virtual camera to a head mounted display. Memories store programs including instructions for obtaining degree information indicating a degree of gaze for the virtual object of a user wearing the head mounted display and changing an optical axis position of the virtual camera. Selectively switching one of the images to another, includes a virtual image corresponding to an appearance of a virtual space from the virtual camera in which the virtual object is arranged, and a mixed image in which a captured image is overlapped by an image corresponding to an appearance of the virtual object, and the head mounted display displays the image as the display image, and changing the position of the virtual camera in the optical axis direction based on the degree information when the plurality of images is selectively switched.

17 Claims, 6 Drawing Sheets

IMAGE PROCESSING APPARATUS, IMAGE PROCESSING METHOD, AND STORAGE DEVICE

CROSS REFERENCE TO PRIORITY APPLICATION

This application claims the benefit of Japanese Patent Application No. 2022-83808, filed May 23, 2022, which is hereby incorporated by reference herein in its entirety.

BACKGROUND

Field

The present disclosure relates to an image processing technique to generate a display image that is displayed on a head mounted display.

Description of the Related Art

There is a head mounted display (in the following, also called HMD) that is worn on the head of a user and that can display an image, such as a moving image, on its display unit. With the HMD, it is possible to give a user a high feeling of being at a live performance. As the image that is displayed on the HMD, there is an image also called virtual reality (in the following, also called VR), which is an image corresponding to the virtual world. Further, as the image that is displayed on the HMD, there is also an image, or the like, also called mixed reality (in the following, also called MR), which is an image obtained by overlapping an image corresponding to the virtual world and an image corresponding to the real world. In order to display an MR image, first, the real world of the environment outside a user (in the following, also called a wearer) wearing the HMD is captured real time with an outward facing imaging device attached to the HMD. Further, an image obtained by overlapping an image corresponding to the virtual world and the captured image corresponding to the real world is displayed on the display unit of the HMD, and, thereby, the MR image is provided to the wearer.

Both in the VR image and in the MR image, an image corresponding to the virtual world is obtained as follows. First, based on position/posture information indicating the position and posture of a wearer, a virtual camera is arranged at the position in the space of the virtual world (in the following, also called a virtual space), which corresponds to the position of the wearer. Further, the appearance from the virtual camera of the virtual space or an object arranged in the virtual space is generated as an image corresponding to the virtual world. Here, in a case of the VR image, it is preferable to arrange the virtual camera at the position in the virtual space, which corresponds to the eye of the wearer.

On the other hand, the image corresponding to the real world in the MR image is an image obtained by the image capturing with the outward facing imaging device, and therefore, the image is captured from a position ahead of the position of the eye of the wearer. "Camera render position" to "Varjo", [search date: Apr. 22, 2022], internet <URL: https://developer.varjo.com/docs/get-started/camera-render-position> has disclosed a method of arranging a virtual camera at the position in the virtual space, which corresponds to the position of an outward facing imaging device at the time of obtaining an MR image. According to the method, it is possible to obtain an MR image in which the image of an object arranged in the virtual space and the image of an object corresponding to the object and existing in the space of the real world are represented with the same distance and size.

SUMMARY

An image processing apparatus for displaying a display image including at least an image corresponding to an appearance of a virtual object from a virtual camera to a head mounted display, the image processing apparatus comprising one or more hardware processors, and one or more memories storing one or more programs configured to be executed by the one or more hardware processors, the one or more programs including instructions for, obtaining a degree information indicating a degree of gaze for the virtual object of a user wearing the head mounted display, and changing a position of the virtual camera in an optical axis direction of the virtual camera based on the degree information.

Further features of the present disclosure will become apparent from the following description of exemplary embodiments with reference to the attached drawings.

DESCRIPTION OF THE EMBODIMENTS

Figure 1:
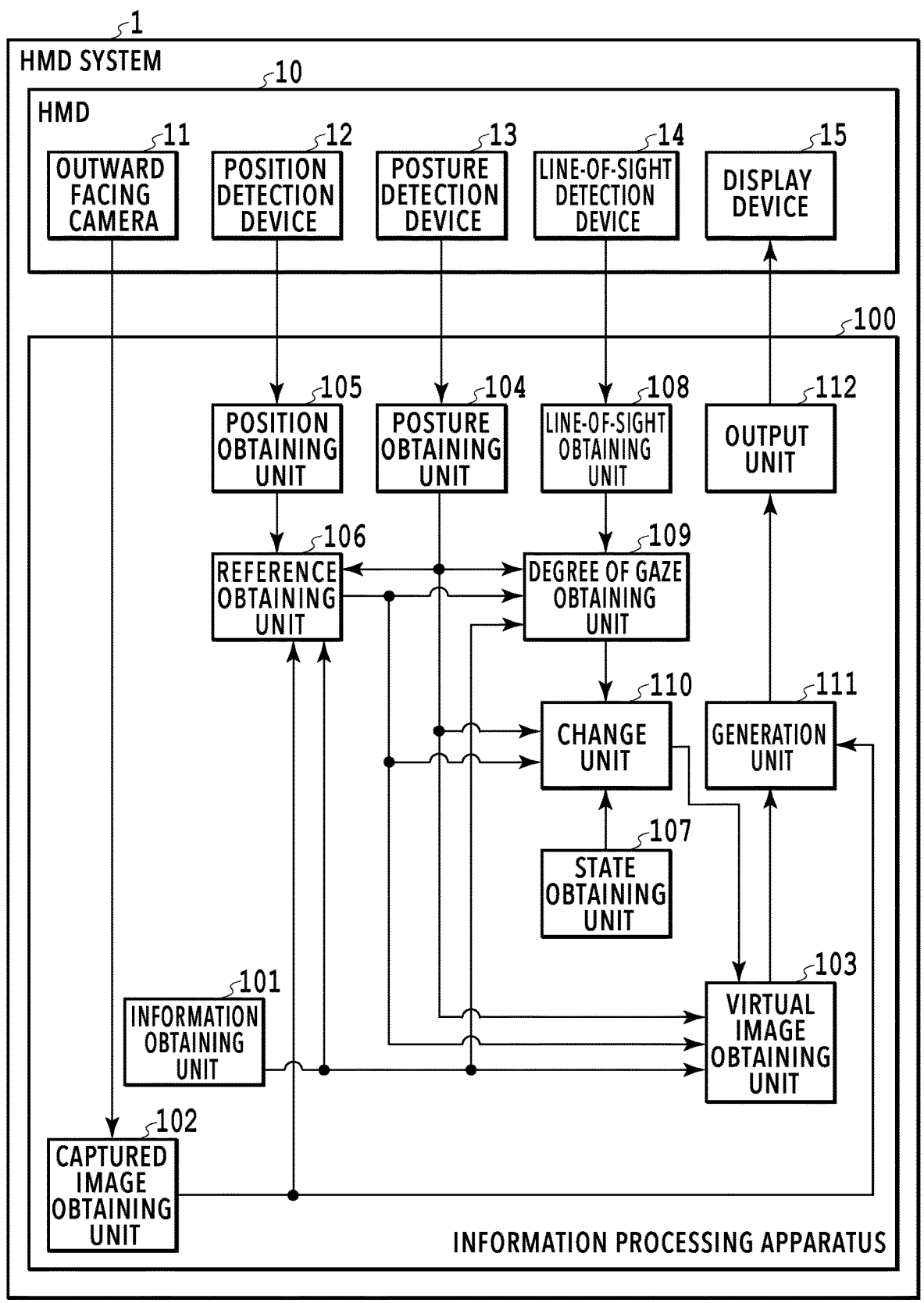
FIG. 1 is a block diagram showing an example of a configuration of an image processing apparatus according to Embodiment 1.

Hereafter, with reference to the attached drawings, the present disclosure is explained in detail in accordance with preferred embodiments. Configurations shown in the following embodiments are merely exemplary and the present disclosure is not limited to the configurations shown schematically.

The appropriate position of a virtual camera in a case when a VR image is obtained and the position of a virtual camera in a case when an MR image is obtained by using the method disclosed in "Camera render position" to "Varjo", [search date: Apr. 22, 2022], internet <URL: https://developer.varjo.com/docs/get-started/camera-render-position> are different from each other in the optical axis direction of the virtual camera. Because of this, in a case when the display on the HMD is switched between the VR image obtained by arranging the virtual camera at the position appropriate for the VR image and the MR image obtained by using the method disclosed in "Camera render position" to "Varjo" [search date: Apr. 22, 2022], internet <URL: https://developer.varjo.com/docs/get-started/camera-render-position>, the position of the virtual camera is changed suddenly in the optical axis direction of the virtual camera. As a result of that, a wearer would feel that the size of the object arranged in the virtual space or the distance from the virtual camera to the object changes suddenly. Because of this, the feeling of being at a live performance is reduced, which is felt by the wearer.

Embodiment 1

In Embodiment 1, whether or not the degree of gaze for an object arranged in the virtual space of a user (in the following, also called a wearer) mounting a head mounted display (in the following, also called HMD) is the minimum. In the present embodiment, as an example, an aspect is explained in which whether or not the degree of gaze for an object (in the following, also called a virtual object) arranged in the virtual space (in the following, also called simply a degree of gaze) is zero is determined. In a case when the degree of gaze is the minimum, the position of the virtual camera is changed in the optical axis direction of the virtual camera. First, the outline of processing that is performed in the present embodiment is explained.

In the present embodiment, an explanation is given on the assumption that the position in the virtual space, which corresponds to the position of the eye of the wearer in the space of the real world (in the following, also called real space) is set as the reference position of the virtual camera. Further, in the present embodiment, an explanation is given on the assumption that the position of the virtual camera in the optical axis direction of the virtual camera is changed by changing the mount of offset in the optical axis direction from the reference position (in the following, also called simply an amount of offset). Furthermore, in the present embodiment, an explanation is given on the assumption that there are two types of display mode called "VR mode" and "MR mode" as the display mode of the HMD. The VR mode is the display mode in which an image of virtual reality (in the following, also called VR) is displayed on the display unit of the HMD. In the following, an explanation is given by calling the state when a VR image is displayed "VR state" particularly. Further, the MR mode is the display mode in which an image of mixed reality (in the following, also called MR) is displayed on the display unit of the HMD, which is an image obtained by overlapping an image corresponding to the virtual world and an image corresponding to the real world. In the following, an explanation is given by calling the state when an MR image is displayed "MR state" particularly. Furthermore, an explanation is given by calling the state when switching from the VR state to the MR state is in progress and the state when switching from the MR state to the VR state is in progress are called the switching-in-progress state in switching from the VR mode to the MR mode or switching from the MR mode to the VR mode.

In the VR state, by setting the amount of offset to zero, the virtual camera is arranged at the same position as the reference position. Due to this, it is possible to provide a VR image without sense of incongruity to the wearer who performs the operation to move his/her head in a variety of ways, and so on. In the MR state, the amount of offset is set, which corresponds to the difference between the position of an outward facing imaging device (in the following, also called an outward facing camera) attached to the HMD and the position of the eye of the wearer. Due to this, the virtual camera is arranged at the same position as the position in the virtual space, which corresponds to the position of the outward facing camera. In the MR state, there is a utilization method in which a virtual object and an object existing in the real space (in the following, also called a real object) are arranged side by side and compared, or a utilization method in which the hand of the wearer existing in the real space and the virtual object are caused to interact with each other, or the like. In the utilization method such as this, by setting the amount of offset as described above, it is possible to display the image of the real object and the image of the virtual object corresponding to the real object with the same size and at the same position. Due to this, it is possible to improve the operability, the feeling of being at a live performance, and the like, of the wearer.

However, in a case when the position of the virtual camera is determined by setting the amount of offset as described above in accordance with the display mode of the HMD, on a condition that the display mode is switched to another, the wearer would feel that the position or the size of the virtual object changes suddenly. As a result of that, the operability and the feeling of being at a live performance of the wearer will reduce. In the present embodiment, by using information indicating the line-of-sight of the wearer (in the following, also called line-of-sight information), the state when the degree of gaze of the wearer for the virtual object is the minimum is detected. Further, in the state when the degree of gaze is the minimum, the position of the virtual camera is changed in the optical axis direction of the virtual camera by changing the amount of offset of the virtual camera. The state when the degree of gaze is the minimum in the present embodiment is, for example, a state when the eye of the wearer is closed (in the following, also called closed eye) because the wearer blinks and so on. By changing the position of the virtual camera while the eye of the wearer is closed, that is, in the closed eye state as described above, it is possible to suppress the wearer from recognizing that the position or size of the virtual object is changed.

The above is the outline of the method of changing the position of the virtual camera that is performed in the present embodiment. The display modes of the HMD and the setting of the amount of offset of the virtual camera in the VR state and the MR state described above are merely an example and it is possible to suppose a variety of display modes and to set the amounts of offset corresponding thereto. Further, the reference position of the virtual camera is not limited to the position in the virtual space, which corresponds to the position of the eye of the wearer and it may also be possible to set an arbitrary position in the virtual space as the reference position of the virtual camera. In this case, as the amount of offset, it is sufficient to set an appropriate value in accordance with the set reference position.

Figure 2B:
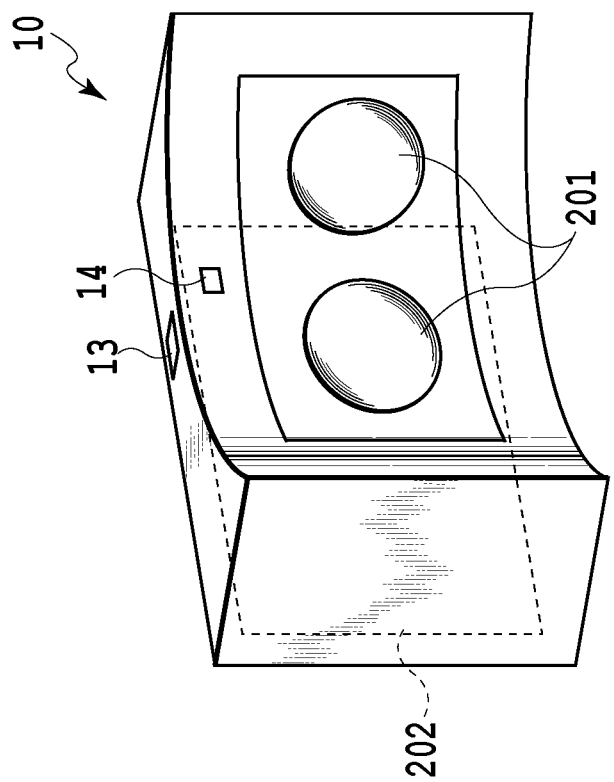
FIG. 2A and FIG. 2B are each a perspective diagram showing an example of an HMD according to Embodiment 1.
Figure 2A:
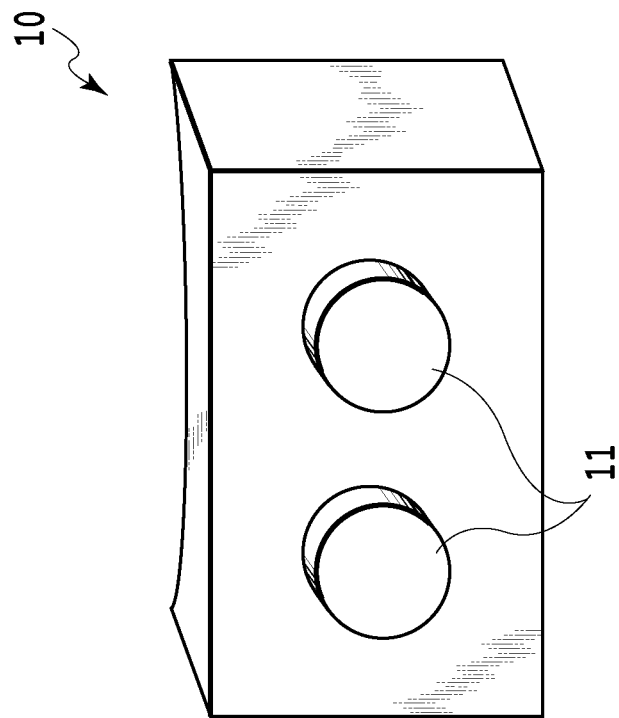
Figure 3:
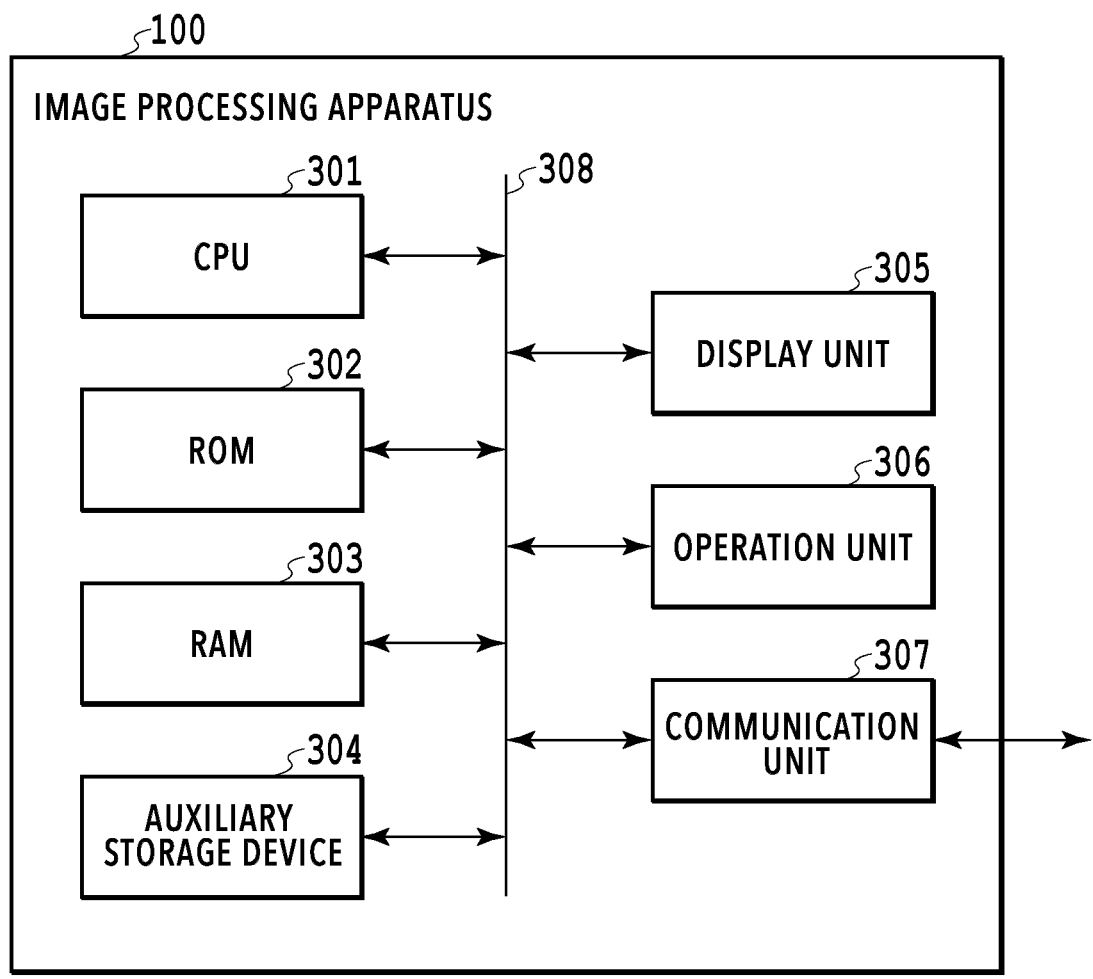
FIG. 3 is a block diagram showing an example of a hardware configuration of the image processing apparatus according to Embodiment 1.

With reference to FIG. 1 and FIG. 3, the configuration of an image processing apparatus 100 according to Embodiment 1 is explained. FIG. 1 is a block diagram showing an example of the configuration of the image processing apparatus 100 according to Embodiment 1. The image processing apparatus 100 is applied to an HMD system 1. The HMD system 1 comprises an HMD 10 and the image processing apparatus 100. As shown in FIG. 1 as example, the HMD 10 comprises, for example, an outward facing camera 11, a position detection device 12, a posture detection device 13, a line-of-sight detection device 14, and a display device 15. With reference to FIG. 1, FIG. 2A, and FIG. 2B, the configuration of the HMD 10 is explained. FIG. 2A and FIG. 2B are each a perspective diagram showing an example of the HMD 10 according to Embodiment 1. Specifically, FIG. 2A is a perspective diagram showing an example of the outer appearance in a case when the HMD 10 is viewed from substantially the front and FIG. 2B is a perspective diagram showing an example of the outer appearance in a case when the HMD 10 is viewed from substantially the rear, that is the side with which the face of a wearer comes into contact. In FIG. 2B, a broken line indicates a region arranged inside the HMD 10.

The outward facing camera 11 is an imaging device attached to the HMD 10 and for capturing the environment around the wearer from the attachment position. The outward facing camera 11 includes, for example, a digital still camera, a digital video camera, or a stereo camera. The outward facing camera 11 outputs data of an image obtained by image capturing (in the following, also called a captured image) to the image processing apparatus 100. The outward facing camera 11 is not limited to that described above as long as it is possible to capture the environment around the wearer from the attachment position and output data of an image obtained by the image capturing. In the following, an explanation is given on the assumption that the outward facing camera 11 is comprised by a stereo camera.

The position detection device 12 (not shown in FIG. 2A or FIG. 2B) is configured to specify the position of the wearer. The position detection device 12 includes, for example, a GNSS (Global Navigation Satellite System) receiver, such as a GPS (Global Positioning System) receiver. The position detection device 12 outputs information, such as a signal capable of specifying the position of the wearer, or information indicating the position of the wearer. The position detection device 12 is not limited to that described above as long as it is possible to output information capable of specifying the position of the wearer or information specifying the position of the wearer. The position specifying method using the GNSS receiver, and the like, is well known, and, therefore, explanation of the specifying method is omitted.

The posture detection device 13 is configured to specify the posture of the wearer, specifically, the orientation of the head of the wearer, more specifically, the direction in which the face of the wearer faces. The posture detection device 13 includes, for example, a geomagnetic sensor, an inclination sensor, an acceleration sensor, or an altitude sensor, or a combination of these sensors. The posture detection device 13 outputs information, such as a signal capable of specifying the posture of the wearer, or information indicating the posture of the wearer. The posture detection device 13 is not limited to that described above as long as it is possible to output information capable of specifying the posture of the wearer or information indicating the posture of the wearer. The posture specifying method using the geomagnetic sensor, the inclination sensor, the acceleration sensor, or the altitude sensor is well known, and, therefore, an explanation of the specifying method is omitted.

The line-of-sight detection device 14 is configured to specify the direction of the line-of-sight (in the following, also called the line-of-sight direction) of the wearer, specifically, the direction in which the pupil of the eyeball of the wearer faces. The line-of-sight detection device 14 includes, for example, an imaging device that captures the eye of the wearer, a light-receiving sensor that receives reflected light, such as infrared light with which the eye of the wearer is irradiated, or the like. The line-of-sight detection device 14 outputs information, such as a signal capable of specifying the line-of-sight of the wearer, or information indicating the line-of-sight direction of the wearer. The line-of-sight detection device 14 is not limited to that described above as long as it is possible to output information capable of specifying the line-of-sight direction of the wearer or information indicating the line-of-sight direction of the wearer. The line-of-sight direction specifying method using the imaging device, the light-receiving sensor that receives reflected light, such as infrared light, or the like, is well known, and, therefore, an explanation of the specifying method is omitted.

The display device 15 (not shown in FIG. 2A or FIG. 2B) includes a pair of eyepiece lenses 201 and a display panel 202. The display device 15 obtains information, such as a signal indicating a display image, and displays the display image on the display panel 202. For example, on the display panel 202, a parallax image in accordance the orientation of the head of the wearer (that is, the orientation of the HMD 10) is displayed as the display image. The display panel 202 includes an LCD (Liquid Crystal Display), an organic electro-luminescence display, or the like. The display panel 202 is not limited to that described above as long as it is possible to display a display image.

The image processing apparatus 100 comprises an information obtaining unit 101, a captured image obtaining unit 102, a virtual image obtaining unit 103, a posture obtaining unit 104, a position obtaining unit 105, and a reference obtaining unit 106. In addition to the above-described configuration, the image processing apparatus 100 comprises a state obtaining unit 107, a line-of-sight obtaining unit 108, a degree of gaze obtaining unit 109, a change unit 110, a generation unit 111, and an output unit 112.

The hardware configuration of the image processing apparatus 100 is explained. The processing of each unit comprised by the image processing apparatus 100 shown in FIG. 1 as an example is performed by hardware, such as an ASIC (Application Specific Integrated Circuit), incorporated in the image processing apparatus 100. The processing may be performed by hardware, such as an FPGA (Field Programmable Gate Array). Further, the processing may be performed by software using a CPU (Central Processor Unit) or a GPU (Graphic Processor Unit), and a memory.

FIG. 3 is a block diagram showing an example of the hardware configuration of the image processing apparatus 100 according to Embodiment 1 in a case when each unit comprised by the image processing apparatus 100 shown in FIG. 1, as an example, operates on software. The image processing apparatus 100 includes a computer and the computer has a CPU 301, a ROM 302, a RAM 303, an auxiliary storage device 304, a display unit 305, an operation unit 306, a communication unit 307, and a bus 308 as shown in FIG. 3 as an example.

The CPU 301 causes the computer to function as each unit comprised by the image processing apparatus 100 shown in FIG. 1 by controlling the computer using programs or data stored in the ROM 302 or the RAM 303. It may also be possible for the image processing apparatus 100 to have one piece or a plurality of pieces of dedicated hardware different from the CPU 301 and the dedicated hardware may perform at least part of the processing that is performed by the CPU 301. As examples of dedicated hardware, there is an ASCI, an FPGA, a DSP (Digital Signal Processor), or the like. The ROM 302 stores programs, and the like, that do not need to be changed. The RAM 303 temporarily stores programs or data supplied from the auxiliary storage device 304, or data, and the like, supplied from the outside via the communication unit 307. The auxiliary storage device 304 includes, for example, a hard disk drive, and the like, and stores various kinds of data, such as image data or voice data.

The display unit 305 includes, for example, a liquid crystal display, an LED, or the like, and displays a GUI (Graphical User Interface), and the like, for a user to operate the image processing apparatus 100 or to perform browsing. The operation unit 306 includes, for example, a keyboard, a mouse, a joystick, a touch panel, or the like, and receives the operation by a user and inputs various instructions to the CPU 301. The CPU 301 also functions as a display control unit configured to control the display unit 305 and an operation control unit configured to control the operation unit 306.

The communication unit 307 is used for communication with an external device of the image processing apparatus 100. For example, in a case when the image processing apparatus 100 is wired-connected with an external device, a communication cable is connected to the communication unit 307. In a case when the image processing apparatus 100 has a function to wirelessly communicate with an external device, the communication unit 307 comprises an antenna. The bus 308 connects each unit comprised by the image processing apparatus 100 and transmits information. In Embodiment 1, an explanation is given on the assumption that the display unit 305 and the operation unit 306 exist inside the image processing apparatus 100, but at least one of the display unit 305 and the operation unit 306 may exist outside the image processing apparatus 100 as a separate device.

The configuration comprised by the image processing apparatus 100 shown in FIG. 1 as an example is explained. In the following, an explanation is given on the assumption that the position in the real space is defined by using a three-dimensional coordinate system in which directions perpendicular to each other on a plane perpendicular to the vertical direction are taken as an x-axis and a y-axis, and the direction opposite to the gravitational direction in the vertical direction is taken as the positive direction of a z-axis. The definition of the position in the real space using the above-described three-dimensional coordinate system is merely an example and the method of defining the position in the real space, such as the method of determining each axis, may be arbitrary.

The information obtaining unit 101 obtains information indicating a virtual space (in the following, also called virtual space information). In the virtual space information, at least information indicating a virtual object is included. Specifically, for example, the virtual space information is data of computer graphics (CG) representing a virtual space. For example, the information obtaining unit 101 obtains virtual space information by reading virtual space information stored in advance in the auxiliary storage device 304. In the following, an explanation is given on the assumption that the position in the virtual space indicated by virtual space information is defined by using the above-described three-dimensional coordinate system. That is, in the present embodiment, the position in the real space and the position in the virtual space, which corresponds to the position in the real space, are represented with the same three-dimensional coordinates. The virtual space information obtained by the information obtaining unit 101 is, for example, stored temporarily in the RAM 303.

The captured image obtaining unit 102 obtains data of a captured image (in the following, also called captured image data) obtained by capturing the real world. Specifically, the captured image obtaining unit 102 obtains data of a captured image that is output from the outward facing camera 11 comprised in the HMD 10 via the communication unit 307. In the present embodiment, the outward facing camera 11 is comprised by a stereo camera, and, therefore, the captured image is a parallax image including a set of two images captured by image capturing by each imaging device on the left side and the right side of the stereo camera. In the present embodiment, as an example, a case is explained where the captured image is a color image of three channels of RGB. The captured image is not limited to a color image and may be a grayscale image whose image after rendering has one channel. The captured image data obtained by the captured image obtaining unit 102 is, for example, stored temporarily in the RAM 303.

The posture obtaining unit 104 obtains information indicating the posture of the wearer, specifically, the orientation of the head of the wearer, more specifically, the direction in which the face of the wearer faces (in the following, also called posture information). Specifically, for example, the posture obtaining unit 104 first obtains information, such as a signal that is output from the posture detection device 13, via the communication unit 307. Next, the posture obtaining unit 104 generates and obtains posture information by specifying the posture of the wearer using the information obtained from the posture detection device 13. The posture information is represented, for example, by using a 3×3 rotation matrix, roll, pitch, and yaw in the above-described three-dimensional coordinate system. The representation method of posture information is not limited to this and the posture information may be represented by another representation method, such as a quaternion. The posture information obtained by the posture obtaining unit 104 is, for example, stored temporarily in the RAM 303.

The position obtaining unit 105 obtains information indicating the position of the wearer, specifically, the position of the head of the wearer (in the following, also called position information). Specifically, for example, the position obtaining unit 105 first obtains information, such as a signal that is output from the position detection device 12, via the communication unit 307. Next, the position obtaining unit 105 generates and obtains position information by specifying the position of the wearer using the information obtained from the position detection device 12. The specifying method of the position of the wearer by the position obtaining unit 105 is not limited to the above-described method. For example, it may also be possible for the position obtaining unit 105 to specify the position of the wearer by a well-known SLAM (Simultaneous Localization and Mapping) method, or the like, using the posture information obtained by the posture obtaining unit 104 and the captured image data obtained by the captured image obtaining unit 102. The position information is represented by using three-dimensional coordinates in the above-described three-dimensional coordinate system. The representation method of position information is not limited to this and any method may be accepted as long as position information is represented in accordance with the coordinate system representing a position in the real space. The position information obtained by the position obtaining unit 105 is, for example, stored temporarily in the RAM 303.

The reference obtaining unit 106 obtains information indicating the reference position of the virtual camera (in the following, also called reference position information). Specifically, for example, the reference obtaining unit 106 obtains reference position information by determining the reference position of the virtual camera based on the posture information obtained by the posture obtaining unit 104 and the position information obtained by the position obtaining unit 105. By the posture information, the direction in which the wearer faces, specifically, the direction in which the face of the wearer faces is specified. Further, by the position information, the position of the wearer, specifically, the position of the head of the wearer is specified. First, the reference obtaining unit 106 obtains, for example, the direction in which the wearer faces as a unit vector in the above-described three-dimensional coordinate system and the position of the wearer as three-dimensional coordinates in the above-described three-dimensional coordinate system. Next, as described above, the reference position of the virtual camera is the position in the virtual space, which corresponds to the position of the eye of the wearer, and, therefore, the reference obtaining unit 106 determines the reference position of the virtual camera so that the obtained three-dimensional coordinates indicate the position of the eye of the wearer. For example, the reference obtaining unit 106 determines three-dimensional coordinates corresponding to the position of the left eye and three-dimensional coordinates corresponding to the position of the right eye as the reference position of the virtual camera in accordance with the positions of the left and right eyes, respectively, of the wearer. The reference obtaining unit 106 obtains the determined reference position of the virtual camera and the obtained unit vector as the reference position information and, for example, causes the RAM 303 to temporarily store the obtained reference position information.

The state obtaining unit 107 obtains the display state of the HMD 10. Specifically, for example, the state obtaining unit 107 first obtains information indicating the display mode (in the following, also called display mode information) of the HMD 10 from the RAM 303, or the like. Further, for example, in a case when the display mode indicated by the obtained display mode information and the display mode indicated by the display mode information obtained immediately before obtaining the display mode information are different from each other, the state obtaining unit 107 obtains the display state by assuming that the HMD 10 is in the switching-in-progress state.

Specifically, in a case when the display mode has been changed from the VR mode to the MR mode, the state obtaining unit 107 obtains the display state by assuming that the HMD 10 is in the switching-in-progress state from the VR state to the MR state. Further, in a case when the display mode has been changed from the MR mode to the VR mode, the state obtaining unit 107 obtains the display state by assuming that the HMD 10 is in the switching-in-progress state from the MR state to the VR state. The condition that the display state be obtained by assuming that the display state is in the VR state or the MR state will be described later. The information indicating the display state obtained by the state obtaining unit 107 is, for example, stored temporarily in the RAM 303. The updating of the display mode information accompanying the change of the display mode of the HMD 10 is performed, for example, by a user operating a button, or the like, not shown in FIG. 2A or FIG. 2B, for changing the display mode and comprised by the HMD 10. The updating method is not limited to that described above and the updating may be performed in a case when an arbitrary condition determined in advance is satisfied.

The line-of-sight obtaining unit 108 obtains line-of-sight information indicating the line-of-sight of the wearer. Specifically, for example, the line-of-sight obtaining unit 108 first obtains information, such as a signal that is output from the line-of-sight detection device 14, via the communication unit 307. Next, the line-of-sight obtaining unit 108 generates and obtains line-of-sight information by specifying the line-of-sight of the wearer using the information obtained from the line-of-sight detection device 14. The line-of-sight information is, for example, represented by using the three-dimensional coordinates indicating the position of the eye in the above-described three-dimensional coordinate system and the three-dimensional unit vector indicating the line-of-sight direction. For example, the line-of-sight obtaining unit 108 obtains the line-of-sight information on the left eye and the right eye, respectively, of the wearer. It may be possible to specify the line-of-sight direction by using, for example, the well-known eye tracking technique. Further, the representation method of line-of-sight information is not limited to this and any method may be used as long as the line-of-sight direction of the wearer can be represented uniquely. The line-of-sight information obtained by the line-of-sight obtaining unit 108 is, for example, stored temporarily in the RAM 303.

The degree of gaze obtaining unit 109 obtains the degree of gaze of the wearer for the virtual object. Specifically, the degree of gaze obtaining unit 109 determines and obtains the degree of gaze by using the line-of-sight information obtained by the line-of-sight obtaining unit 108. In a case when data (three-dimensional coordinates) indicating the position of the eye and data (three-dimensional unit vector) indicating the line-of-sight direction are not included in the line-of-sight information, the degree of gaze is determined to be the minimum value in a predetermined range, such as zero. The line-of-sight direction is specified based on the image obtained by capturing the eye of the wearer, or the signal obtained by receiving reflected light, such as infrared light with which the eye of the wearer has been irradiated, or the like. For example, in the state when the eyelid of the wearer is closed (closed-eye state), such as during blinking, it is not possible to ascertain the position, the direction, or the like, of the pupil or the cornea of the wearer. Consequently, the line-of-sight information obtained by the line-of-sight obtaining unit 108 does not include the data (three-dimensional coordinates) indicating the position of the eye and the data (three-dimensional unit vector) indicating the line-of-sight direction. Because of this, in the present embodiment, the state when the line-of-sight information cannot be obtained is taken as the closed-eye state due to blinking, and the like, and the degree of gaze is determined to be the minimum value.

The method of determining the degree of gaze to be the minimum value is not limited to this. For example, in a case when the line-of-sight information includes information indicating the closed-eye state, the degree of gaze obtaining unit 109 may determine the degree of gaze to be the minimum value. In this case, on a condition that it is not possible to ascertain the position, direction, or the like, of the pupil or cornea of the wearer, the line-of-sight obtaining unit 108 generates the line-of-sight information including information indicating the closed-eye state. Further, the determination method of the degree of gaze by the degree of gaze obtaining unit 109 is not limited to this. For example, it may also be possible for the degree of gaze obtaining unit 109 to determine the degree of gaze based on the line-of-sight direction indicated by the line-of-sight information, the relative position of the virtual object in the virtual space from the positions in the virtual space, which corresponds to the position of the eye of the wearer, and the like. An aspect in which the degree of gaze is determined based on the line-of-sight direction indicated by the line-of-sight information, the relative position of the virtual object in the virtual space from the positions in the virtual space, which corresponds to the position of the eye of the wearer, and the like, will be described later in Embodiment 2.

The change unit 110 changes the position of the virtual camera in the optical axis direction of the virtual camera based on the degree of gaze obtained by the degree of gaze obtaining unit 109. Specifically, the change unit 110 changes the position of the virtual camera in the optical axis direction by changing the amount of offset in the optical axis direction from the reference position of the virtual camera based on the degree of gaze. For example, the change unit 110 changes the amount of offset in the optical axis direction from the reference position of the virtual camera based on the degree of gaze in a case when the VR mode is switched to the MR mode or the MR mode is switched to the VR mode. That is, the change unit 110 changes the amount of offset based on the degree of gaze in a case when the display state of the HMD 10 obtained by the state obtaining unit is the switching-in-progress state from the VR state to the MR state or the switching-in-progress state from the MR state to the VR state.

More specifically, in a case when the display state of the HMD 10 is the switching-in-progress state from the VR state to the MR state and the degree of gaze is the minimum value, the position of the virtual camera is changed to the position in the virtual space, which corresponds to the position of the outward facing camera 11. That is, in this case, the change unit 110 changes the position of the virtual camera by changing the amount of offset to the value corresponding to the distance between the position in the virtual space, which corresponds to the position of the outward facing camera 11, and the position in the virtual space, which corresponds to the position of the eye of the wearer. After the change, the display state of the HMD 10 is changed to the MR state. The amount of offset is defined by, for example, the three-dimensional unit vector in the above-described three-dimensional coordinate system and the amount of scalar. The definition of the amount of offset is not limited to this and the amount of offset may be defined as three-dimensional coordinates. Further, in a case when the display state of the HMD 10 is the switching-in-progress state from the MR state to the VR state and the degree of gaze is the minimum value, the position of the virtual camera is changed to the position in the virtual space, which corresponds to the position of the eye of the wearer taken as the reference position of the virtual camera. That is, in this case, the change unit 110 changes the amount of offset to zero. After the change, the display state of the HMD 10 is changed to the VR state.

The virtual image obtaining unit 103 obtains the image corresponding to the appearance of the virtual object from the virtual camera. Specifically, the virtual image obtaining unit 103 generates the image (in the following, also called virtual camera image) in a case when the virtual space is viewed from the virtual camera arranged in accordance with the reference position of the virtual camera, which is obtained by the reference obtaining unit 106, and the mount of offset changed by the change unit 110. Specifically, for example, as the virtual camera, there are two virtual cameras corresponding to each of the left and right eyes of the wearer. The reference position of one of the two virtual cameras is set at the position in the virtual space, which corresponds to the position of one of the left and right eyes of the wearer, and the reference position of the other of the two virtual cameras is set at the position in the virtual space, which corresponds to the position of the other of the left and right eyes of the wearer. Each of the two virtual cameras is arranged at the position obtained by adding the amount of offset to the reference position of each virtual camera.

The virtual image obtaining unit 103 generates the virtual camera image corresponding to each of the two virtual cameras from the position and orientation (optical axis direction) of each of the two virtual cameras by the publicly known CG rendering processing using the virtual space information obtained by the information obtaining unit 101.

As the viewing angle of the virtual camera image, for example, a fixed value is used, which is set in advance based on the size of the display device 15 comprised by the HMD 10, the distance between the position of the eye of the wearer and the display device 15, or the like. Data of the virtual camera image (in the following, also called virtual camera image data) obtained by the virtual image obtaining unit 103 is, for example, stored temporarily in the RAM 303.

The generation unit 111 generates data of the display image (in the following, also called display image data) that the display device 15 comprised by the HMD 10 is caused to display in accordance with the display state obtained from the state obtaining unit 107. For example, in a case when the display state is the VR state, or the switching-in-progress state from the MR state to the VR state, the generation unit 111 generates the display image data by taking the virtual camera image data obtained by the virtual image obtaining unit 103 as the display image data as it is. Further, in a case when display state is the MR state, or the switching-in-progress state from the VR state to the MR state, the display image data is generated as follows. In this case, the generation unit 111 combines the captured image obtained by the captured image obtaining unit 102 and the virtual camera image obtained by the virtual image obtaining unit 103 and generates data of the image obtained by the combination (in the following, also called combined image) as the display image data. The output unit 112 outputs the display image data generated by the generation unit 111 to the HMD 10 and causes the display device 15 comprised by the HMD 10 to display the display image.

Figure 4:
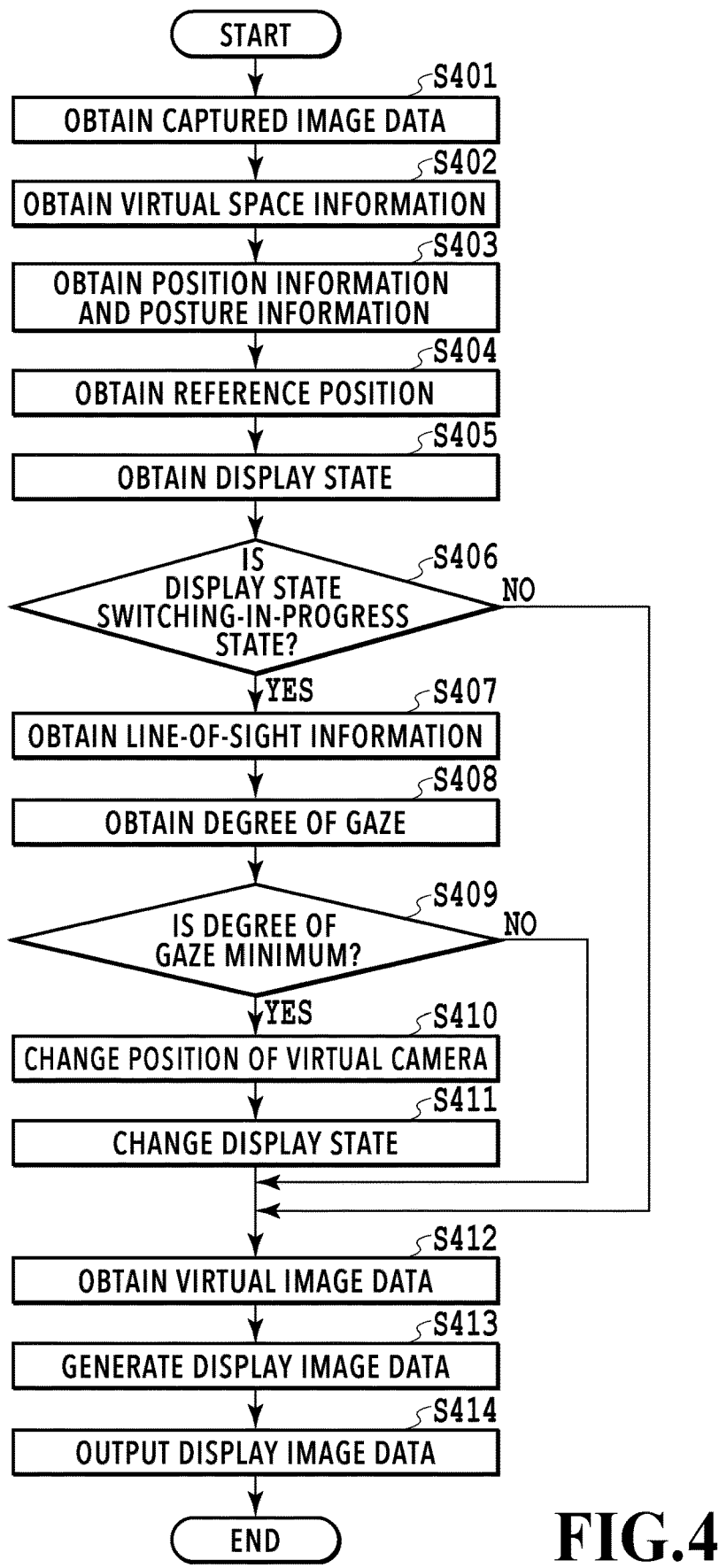
FIG. 4 is a flowchart showing an example of a processing flow of the image processing apparatus according to Embodiment 1.

With reference to FIG. 4, the operation of the image processing apparatus 100 is explained. FIG. 4 is a flowchart showing an example of a processing flow of the image processing apparatus 100 according to Embodiment 1. The image processing apparatus 100 performs the processing of the flowchart shown in FIG. 4 repeatedly. In the following explanation, a symbol "S" means a step. First, at S401, the captured image obtaining unit 102 obtains captured image data. Next, at S402, the information obtaining unit 101 obtains virtual space information. Next, at S403, the posture obtaining unit 104 obtains posture information and the position obtaining unit 105 obtains position information. In a case when the position obtaining unit 105 obtains position information based on information, such as a signal that is output from the position detection device 12, it is sufficient to perform the processing at S401 before processing at S414, to be described later. Further, in this case, on a condition that captured image data is not necessary at the time of the generation unit 111 generating display image data, such as a case when the display state is the VR state, it is not necessarily required to perform the processing at S401.

Next, at S404, the reference obtaining unit 106 obtains reference position information. Next, at S405, the state obtaining unit 107 obtains the display state of the HMD 10. Next, at S406, for example, the line-of-sight obtaining unit 108 determines whether or not the display state obtained at S405 is the switching-in-progress state. In a case when the display state is determined to be the switching-in-progress state at S406, the line-of-sight obtaining unit 108 obtains line-of-sight information at S407. After S407, the degree of gaze obtaining unit 109 obtains the degree of gaze of the wearer for the virtual object at S408. After S408, the change unit 110 determines whether or not the degree of gaze is the minimum value at S409. In a case when the degree of gaze is determined to be the minimum value at S409, the change unit 110 changes the position of the virtual camera at S410.

After S410, for example, the change unit 110 changes the display state to the display state corresponding to the display mode at S411.

After S411, or in a case when the display state is determined not to be the switching-in-progress state at S406, or in a case when the degree of gaze is determined not to be the minimum value at S409, the virtual image obtaining unit 103 obtains virtual camera image data at S412. After S412, the generation unit 111 generates display image data at S413 and at S414, the output unit 112 outputs the image display data generated at S413. After S414, the image processing apparatus 100 terminates the processing of the flowchart shown in FIG. 4 and returns to S401, and performs the processing of the flowchart repeatedly.

According to the image processing apparatus 100 configured as above, in a case when the eye of the wearer is closed, that is, in a case when the degree of gaze of the wearer for the virtual object is the minimum value, it is possible to change the position of the virtual camera. Due to this, it is possible to move the virtual camera while suppressing the wearer from perceiving the change of the virtual object accompanying the movement of the virtual camera. As a result, according to the image processing apparatus 100, it is possible to change the position of the virtual camera without losing the feeling of being at a live performance, which is felt by the wearer.

In Embodiment 1, the method of changing the position of the virtual camera is explained by taking the case as an example where the VR mode is switched to the MR mode or the MR mode is switched to the VR mode, but the application range of the image processing apparatus according to the present disclosure is not limited to this. It is also possible to apply the image processing apparatus according to the present disclosure to, for example, a case when two VR modes different from each other exist and the mode is switched from one of the VR modes to the other, and the like.

Embodiment 2

Figure 5:
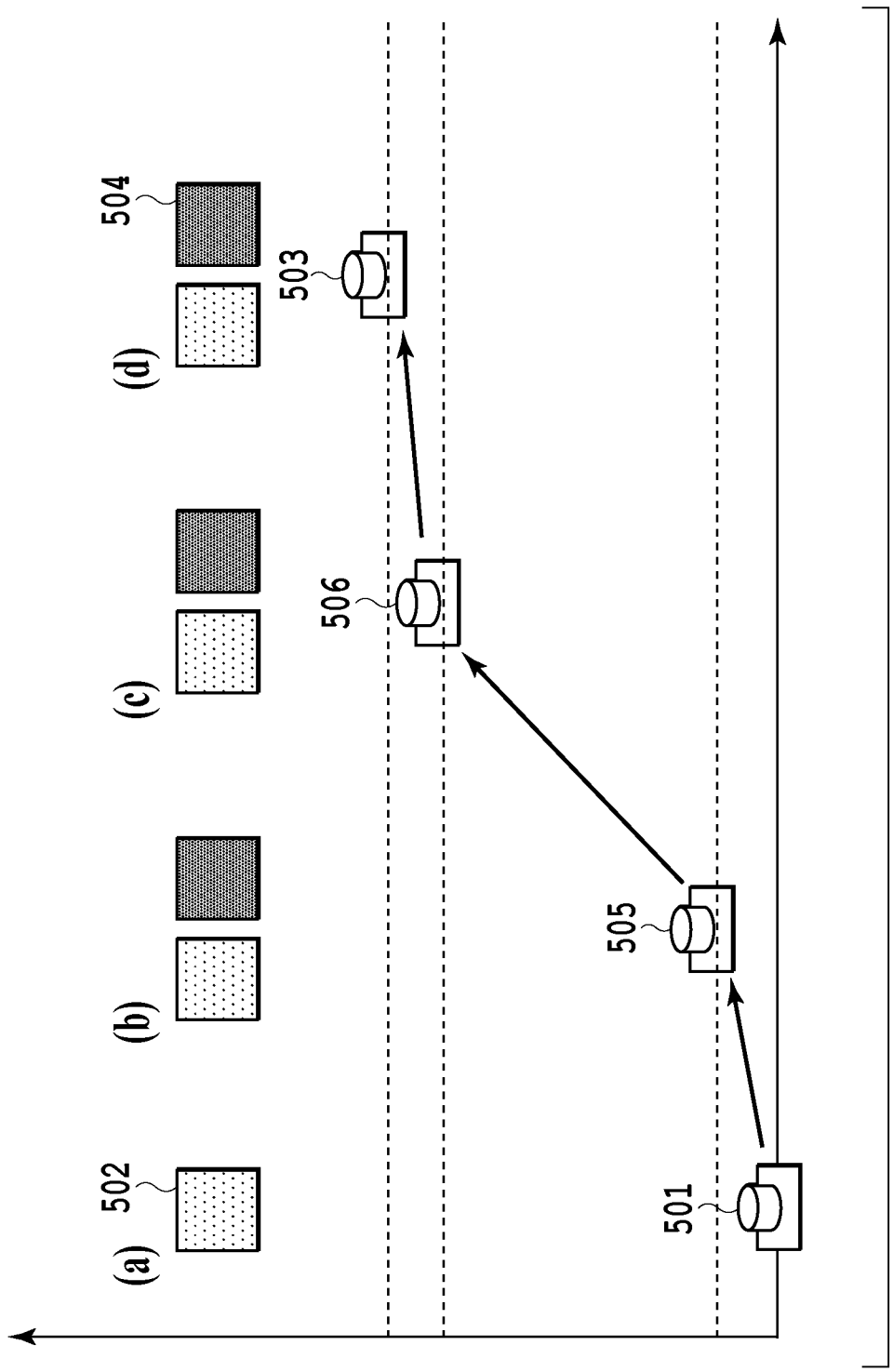
FIG. 5 is an explanatory diagram for explaining an example of processing that is performed in an image processing apparatus according to Embodiment 2.
Figure 6:
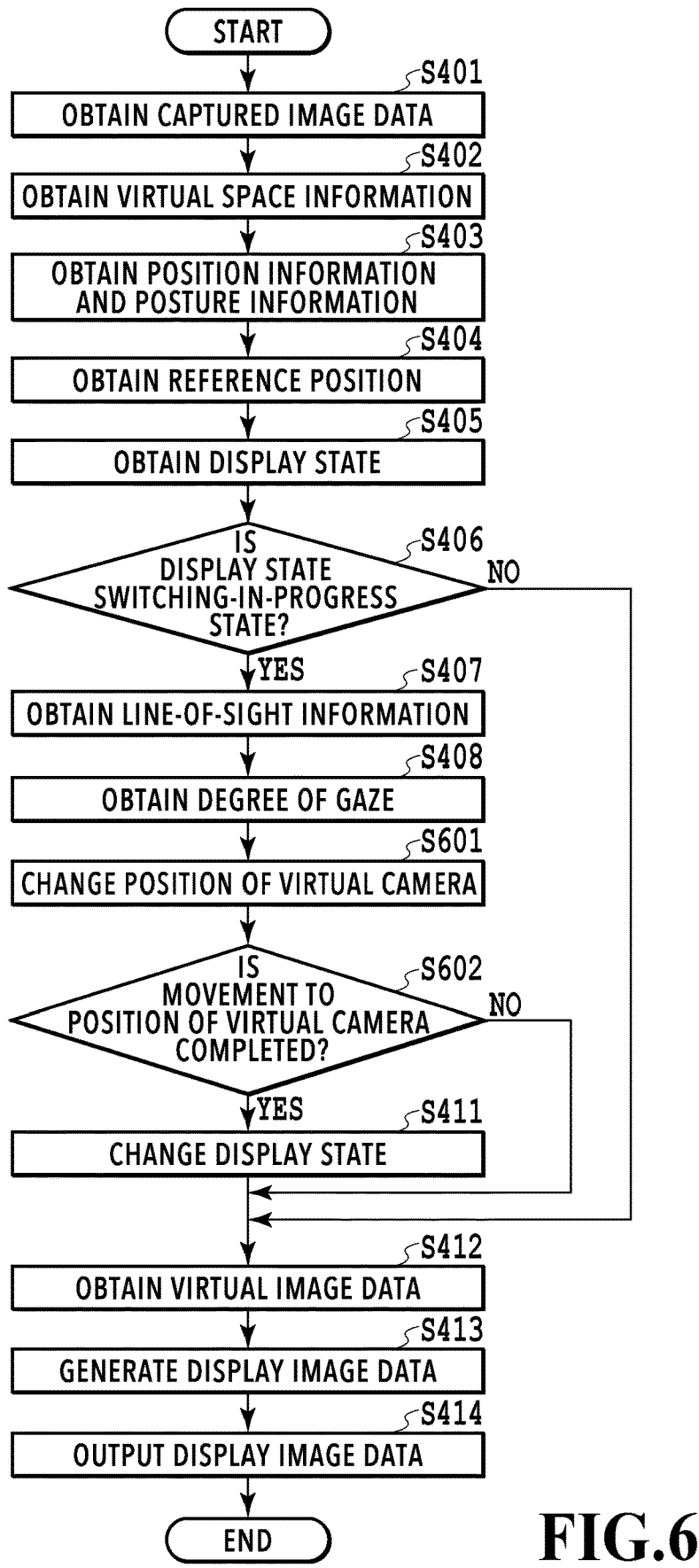
FIG. 6 is a flowchart showing an example of a processing flow of the image processing apparatus according to Embodiment 2.

With reference to FIG. 1, FIG. 5, and FIG. 6, the image processing apparatus 100 according to Embodiment 2 is explained. In the image processing apparatus 100 according to Embodiment 1, whether or not the degree of gaze of a wearer for a virtual object is the minimum value is determined and the position of a virtual camera is changed in the optical axis direction of the virtual camera in a case when the degree of gaze is the minimum value. In Embodiment 2, an aspect is explained in which the amount of change is varied based on the degree of gaze of a wearer for a virtual object at the time of changing the position of a virtual camera in the optical axis direction of the virtual camera.

The image processing apparatus 100 according to Embodiment 2 (in the following, simply called image processing apparatus 100) comprises each unit shown as an example in FIG. 1 like the image processing apparatus 100 according to Embodiment 1. The processing of each unit comprised by the image processing apparatus 100 is performed by hardware, such as an ASIC or an FPGA, incorporated in the image processing apparatus 100 as in the case of the image processing apparatus 100 according to Embodiment 1. The processing may be performed by software using a memory, such as a RAM, and a processor, such as a CPU. Further, as in the case of the image processing apparatus 100 according to Embodiment 1, the image processing apparatus 100 is applied to the image processing system 1 shown as an example in FIG. 1. In the following, each unit other than the degree of gaze obtaining unit 109 and the change unit 110 comprised by the image processing apparatus 100 is the same as each corresponding unit comprised by the image processing apparatus 100 according to Embodiment 1, and, therefore, a detailed explanation is omitted.

First, with reference to FIG. 5, the outline of the processing to change the amount of change based on the degree of gaze of a wearer for a virtual object, which is performed in the image processing apparatus 100, is explained. FIG. 5 is an explanatory diagram for explaining an example of the processing that is performed in the image processing apparatus 100 according to Embodiment 2. FIG. 5 shows an example of the change over time of the position of a virtual camera in a case when the display mode is changed from the VR mode to the MR mode. In FIG. 5, the horizontal axis represents the elapse of time and the vertical axis represents the position in the virtual space.

(a) in FIG. 5 shows an example of the position of a virtual camera 501 before the display mode is changed from the VR mode to the MR mode, that is, in the VR state. At this time, on the display device 15 of the HMD 10, an image corresponding to the appearance in a case where a virtual object 502 arranged in the virtual space is viewed from the virtual camera 501 is displayed. (d) in FIG. 5 shows an example of the position of a virtual camera 503 in the MR state after the display mode is changed from the VR mode to the MR mode. At this time, on the display device 15, an image is displayed, in which an image corresponding to the appearance in a case when the virtual object 502 is viewed from the virtual camera 503 and a captured image obtained by outward facing camera 11, not shown schematically in FIG. 5, capturing a real object 504 overlap.

Further, (b) and (c) in FIG. 5 each shows an example of the position of a virtual camera 505 and that of a virtual camera 506, respectively, in the switching-in-progress state from the VR state to the MR state after the display mode is changed from the VR mode to the MR mode. At this time, on the display device 15, an image is displayed, in which an image corresponding to the appearance in a case the virtual object 502 is viewed from the virtual camera 505 or 506 and a captured image obtained by the outward facing camera 11, not shown schematically in FIG. 5, capturing the real object 504 overlap.

In the VR state, the virtual camera 501 is set at the position of the eye of the wearer and, in the MR state, the virtual camera 503 is set at the position in the virtual space, which corresponds to the outward facing camera 11 comprised by the HMD 10. Because of this, the virtual camera 501 is installed at the position distant from the virtual object 502 compared to the virtual camera 503. As described above, in the present embodiment, in a case when the VR state is changed to the MR state, based on the degree of gaze of the wearer for the virtual object 502, the position of the virtual camera is moved gradually close to the position of the virtual camera 503 shown as an example in (d) in FIG. 5.

Specifically, in a case when the degree of gaze of the wearer for the virtual object 502 is high, the amount of movement of the virtual camera is reduced and for example, the virtual camera 501 is moved from the position of the virtual camera 501 to the position of the virtual camera 505. More specifically, for example, in this case, the amount of movement per unit time of the virtual camera is reduced, and during a predetermined period of time, the virtual camera 501 is moved slowly from the position of the virtual camera 501 to the position of the virtual camera 505. Due to this, it is possible to suppress the wearer from perceiving the change of the virtual object accompanying the movement of the virtual camera. In contrast to this, in a case when the degree of gaze of the wearer for the virtual object 502 is low, the amount of movement of the virtual camera is increased and for example, the virtual camera 505 is moved from the position of the virtual camera 505 to the position of the virtual camera 506. In this case, the amount of movement per unit time of the virtual camera 505 is increased and, during a predetermined period of time, the virtual camera 505 is moved quickly from the position of the virtual camera 505 to the position of the virtual camera 506. Due to this, it is possible to move the position of the virtual camera 505 quite close to the position of the virtual camera 503 in the final state shown as an example in (d) in FIG. 5, while suppressing the wearer from perceiving the change of the object accompanying the movement of the virtual camera.

In the image processing apparatus 100 according to Embodiment 1, the VR state and the MR state are switched by moving the virtual camera in a case when the degree of gaze for the virtual object becomes the minimum, such as in the state when the eye of the wearer is closed. Due to this, it is made possible to move the virtual camera while suppressing the wearer from perceiving the change of the virtual object accompanying the movement of the virtual object. However, with the method explained in Embodiment 1, during the period of time from switching of the display modes until the degree of gaze becomes the minimum, the movement of the virtual camera is not performed. Because of this, depending on the timing at which the degree of gaze of the wearer becomes the minimum, there is a case when the movement of the virtual camera is not performed for a long period of time after instructions to switch the display modes by the wearer. In contrast to this, in a case of the image processing apparatus 100 according to Embodiment 2, even in the state when the degree of gaze is not the minimum, it is possible to change the amount of movement of the virtual camera in accordance with the degree of gaze and move the virtual camera. Because of this, according to the image processing apparatus 100 of Embodiment 2, even in the state when the degree of gaze is not the minimum, it is possible to move the position of the virtual camera while suppressing the wearer from perceiving the change of the virtual object accompanying the movement of the virtual camera.

The configuration of the image processing apparatus 100 according to Embodiment 2 is explained. The degree of gaze obtaining unit 109 obtains a degree of gaze by using the posture information obtained by the posture obtaining unit 104, the line-of-sight information obtained by the line-of-sight obtaining unit 108, the information indicating the current position of the virtual camera, and the virtual space information obtained by the information obtaining unit 101. Specifically, for example, the degree of gaze obtaining unit 109 first obtains three-dimensional coordinates indicating the center of gravity, the center, or the like (in the following, also called center coordinates), of a virtual object by using the virtual space information. The three-dimensional coordinate system may be the same as that in Embodiment 1. Further, in order to obtain the center coordinates of the virtual object, it is sufficient to appropriately perform calculation in accordance with the data format of the virtual space information.

For example, in a case when the data format of the virtual space information is polygon data including three-dimensional coordinates of vertexes and data indicating planes, such as a triangle list, it is sufficient to obtain the center coordinates by calculating the average value, the centroid value, or the like, of the three-dimensional coordinates of a plurality of vertexes included in the polygon data. For the center coordinates of the virtual object, it is only required to be capable of obtaining three-dimensional coordinates indicating an approximate position of the center of the virtual object, and, therefore, the method of calculating the center coordinates may be selected arbitrarily. Further, for the center coordinates, it is sufficient to calculate only the center coordinates of the virtual object that can be displayed on the display device 15 of the HMD 10 both in the VR state and in the MR state. Furthermore, it may also be possible to limit the virtual objects from which the center coordinates are obtained by excluding the virtual object existing at a position distant from the current position of the virtual object from the virtual objects that can be displayed on the display device 15 both in the VR state and in the MR state.

Next, the degree of gaze obtaining unit 109 obtains three-dimensional coordinates indicating the position in the virtual space, at which the wearer gazes (in the following, also called gaze coordinates), by using the line-of-sight information and the posture information. The gaze coordinates are obtained by, for example, calculating the three-dimensional coordinates of the intersection of two rays whose start points are the three-dimensional coordinates indicating the positions of each of the left and right eyes and that extend in the directions of the three-dimensional unit vectors indicating the line-of-sight directions of each of the left and right eyes. Further, the degree of gaze obtaining unit 109 calculates a three-dimensional vector whose start point is the current position of the virtual camera and whose end point is the center coordinates of the virtual object, and a three-dimensional vector whose start point is the current position of the virtual camera and whose end point is the gaze coordinates. In the following, as an example, an explanation is given on the assumption that the three-dimensional coordinates of the position of the virtual camera are the average values of the three-dimensional coordinates indicating the positions of each of the two left and right virtual cameras. The above-described virtual camera position determination method is merely an example and, for example, it may also be possible to use the three-dimensional coordinates of one of the two left and right virtual cameras as the position of the virtual camera.

Next, the degree of gaze obtaining unit 109 calculates an angle $\theta$ formed by the two calculated three-dimensional vectors and, for example, takes the value of $\cos\theta$ as the current degree of gaze of the wearer for the virtual object. In the following, an explanation is given by assuming that the degree of gaze is taken to be zero irrespective of the magnitude of $\theta$ in a case when $\theta$ is greater than or equal to ninety degrees. The degree of gaze obtained by the degree of gaze obtaining unit 109 is, for example, stored temporarily in the RAM 303.

In the above, the method that uses the posture information and the line-of-sight information in a case of obtaining the degree of gaze is explained, but it may also be possible for the degree of gaze obtaining unit 109 to obtain the degree of gaze by using only the posture information. Specifically, for example, the posture information at the point in time before the point in time at which the current processing is performed is stored in advance in the RAM 303, or the like, and in a case when the difference between the posture at the previous point in time and the current posture is great, the degree of gaze is set low and in a case when the difference is low, the degree of gaze is set high. In a case when the change in the posture of the wearer is great, the wearer moves quickly, and, therefore, the degree of gaze is set low by determining that the viewpoint is not fixed. In this case, for example, an angle q is calculated, which is formed by the direction in which the face of the wearer faces, which is indicated by the posture information at the previous point in time, and the direction in which the face of the wearer faces, which is indicated by the current posture information, and the value of cos φ is taken to be the degree of gaze.

Further, it may also be possible for the degree of gaze obtaining unit 109 to calculate the product of the degree of gaze obtained by using the posture information and the line-of-sight information and the degree of gaze obtained by using only the posture information and to take the product as the degree of gaze of the wearer for the virtual object. In the above, as an example, the degree of gaze is calculated by using the cosine of the angle formed by the vectors or the directions, but the degree of gaze obtaining method is not limited to this. For example, it may also be possible to obtain the degree of gaze by another method, such as a method of obtaining the degree of gaze by linearly determining the degree of gaze based on the degree of the angle.

The change unit 110 determines the amount of movement of the virtual camera based on the degree of gaze obtained by the degree of gaze obtaining unit 109 and changes the position of the virtual camera. In the following, specific processing is explained. Specifically, for example, the change unit 110 first obtains an amount of offset d that is set currently and an amount of offset dMR that should be set in the MR state from the RAM 303, or the like. Next, the change unit 110 calculates a temporary amount of offset dt so that, for example, the amount of offset changes linearly as the degree of gaze becomes high. Specifically, the change unit 110 changes the temporary amount of offset dt, for example linearly, so that the amount of offset becomes dmax, which is the maximum, in a case when the degree of gaze is zero, or the like, which is the minimum value, and the amount of offset becomes zero, which is the minimum, in a case where the degree of gaze is one, or the like, which is the maximum value. It may also be possible to change the temporary amount of offset nonlinearly, not limited to linearly, for example, so that the higher the degree of gaze, the more slowly the value is changed and the lower the degree of gaze, the more rapidly the value is changed.

Further, the change unit 110 adds the temporary amount of offset dt to the amount of offset d that is set currently in a case when the display state obtained by the state obtaining unit 107 is the switching-in-progress state from the VR state to the MR state. At this time, in a case when the value d+dt obtained by the addition is smaller than or equal to dMR, the change unit 110 updates the amount of offset that is set currently to the value d+dt obtained by the addition and changes the position of the virtual camera. Further, in a case when the value d+dt obtained by the addition is greater than dMR, the change unit 110 updates the amount of offset that is set currently to dMR and changes the position of the virtual camera. On the other hand, in a case when the display state obtained from the state obtaining unit 107 is the switching-in-progress state from the MR state to the VR state, the change unit 110 subtracts the temporary amount of offset dt from the amount of offset d that is set currently. At this time, in a case when the value d−dt obtained by the subtraction is greater than or equal to zero, the change unit 110 updates the amount of offset that is set currently to the value d−dt obtained by the subtraction and changes the position of the virtual camera. Further, in a case when the value d−dt obtained by the subtraction is less than zero, that is, in a case when the value d−dt is a negative value, the change unit 110 updates the amount of offset that is set currently to zero and changes the position of the virtual camera.

Further, in a case when the display state is the switching-in-progress state from the VR state to the MR state, the change unit 110 changes the display state to the MR state at timing at which the amount of offset that is set currently becomes the same value as the amount of offset dMR in the MR state. Furthermore, in a case when the display state is the switching-in-progress state from the MR state to the VR state, the change unit 110 changes the display state to the VR state at timing at which the amount of offset that is set currently becomes zero.

With reference to FIG. 6, the operation of the image processing apparatus 100 is explained. FIG. 6 is a flowchart showing an example of a processing flow of the image processing apparatus 100 according to Embodiment 2. The image processing apparatus 100 performs the processing of the flowchart shown in FIG. 6 repeatedly. In the following explanation, for the same processing as that of the image processing apparatus 100 according to Embodiment 1, the same symbol as that in FIG. 4 is used and an explanation thereof is omitted. First, the image processing apparatus 100 performs the processing at S401 to S408. After S408, at S601, the change unit 110 determines the amount of movement of the virtual camera based on the degree of gaze obtained at S408 and changes the position of the virtual camera. After S601, at S602, the change unit 110 determines whether or not the movement of the virtual camera to the position of the virtual camera in the display state corresponding to the display mode is completed. In a case when it is determined that the movement of the virtual camera is completed at S602, at S411, for example, the change unit 110 changes the display state to the display state corresponding to the display mode. After S411, or in a case when it is determined that the display state is not the switching-in-progress state at S406, or in a case when it is determined that the movement of the virtual camera is not completed at S602, the image processing apparatus 100 performs the processing at S412 to S414. After S414, the image processing apparatus 100 terminates the processing of the flowchart shown in FIG. 6 and returns to S401 and performs the processing of the flowchart repeatedly.

According to the image processing apparatus 100 configured as above, by changing the amount of movement of the virtual camera based on the degree of gaze, it is possible to move the position of the virtual camera while suppressing the wearer from perceiving the change of the virtual object accompanying the movement of the virtual camera. Due to this, also during the period of time until the degree of gaze of the wearer for the virtual object becomes the minimum, it is possible to change the position of the virtual camera without losing the feeling of being at a live performance, which is felt by the wearer.

In Embodiment 2, the method of changing the position of the virtual camera is explained by taking a case, as an example, when the VR mode is switched to the MR mode or the MR mode is switched to the VR mode, but the application range of the image processing apparatus according to the present disclosure is not limited to this. It is also possible to apply the image processing apparatus according to the present disclosure to a case when, for example, two VR modes different from each other exist and one of the VR modes is switched to the other VR mode, and the like.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the image processing apparatus of the present disclosure, it is possible to change the size of an image of an object arranged in the virtual space to an appropriate size without losing the feeling of being at a live performance, which is felt by a wearer.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, it may also be possible to use both Embodiment 1 and Embodiment 2, and in a case when the line-of-sight information cannot be obtained in the processing of Embodiment 2, or in a case when information indicating the closed-eye state is included in the line-of-sight information, it may also be possible to perform the processing of Embodiment 1.

What is claimed is:

1. An image processing apparatus for displaying a display image including at least an image corresponding to an appearance of a virtual object from a virtual camera to a head mounted display, the image processing apparatus comprising:
   one or more hardware processors; and
   one or more memories storing one or more programs configured to be executed by the one or more hardware processors, the one or more programs including instructions for:
      obtaining degree information indicating a degree of gaze for the virtual object of a user wearing the head mounted display; and
      changing a position of the virtual camera in an optical axis direction of the virtual camera based on the degree information,
   wherein one of a plurality images is selectively switched to another, which at least includes a virtual image corresponding to an appearance of a virtual space from the virtual camera, in which the virtual object is arranged, and a mixed image in which a captured image obtained by image capturing by an imaging device is overlapped by an image corresponding to an appearance of the virtual object from the virtual camera, and the head mounted display is caused to display the image as the display image, and
   the position of the virtual camera is changed in the optical axis direction based on the degree information in a case when the plurality of images is switched selectively.

2. The image processing apparatus according to claim 1, wherein the position of the virtual camera is changed in the optical axis direction by changing an amount of offset in the optical axis direction from a reference position of the virtual camera based on the degree information.

3. The image processing apparatus according to claim 2, wherein the one or more programs further include instructions for:
   obtaining position/posture information indicating a position and posture of the user; and
   obtaining the reference position based on the position/posture information.

4. The image processing apparatus according to claim 1, wherein the one or more programs further include an instruction for:
   obtaining a display state of the head mounted display,
   wherein the head mounted display is caused to display the display image in accordance with the display state among the plurality of images.

5. The image processing apparatus according to claim 1, wherein the position of the virtual camera is changed from a position in the virtual space, which corresponds to a position of the eye of the user, to a position in the virtual space, which corresponds to a position of the imaging device, based on the degree information in a case when the virtual image is switched to the mixed image.

6. The image processing apparatus according to claim 1, wherein the position of the virtual camera is changed from a position in the virtual space, which corresponds to a position of the imaging device, to a position in the virtual space, which corresponds to a position of the eye of the user, based on the degree information in a case when the mixed image is switched to the virtual image.

7. The image processing apparatus according to claim 1, wherein, in a case when the degree of gaze is low, the position of the virtual camera is changed in the optical axis direction so that an amount of change in the position of the virtual camera becomes large compared to that in a case when the degree of gaze is high.

8. The image processing apparatus according to claim 1, wherein the degree of gaze is determined and obtained as the degree information based on line-of-sight information indicating a line-of-sight of the user.

9. The image processing apparatus according to claim 8, wherein, in a case when data indicating a line-of-sight direction is not included in the line-of-sight information or in a case when the line-of-sight information indicates a closed-eye state of the user, the degree of gaze is determined to be a small value.

10. The image processing apparatus according to claim 8, wherein the one or more programs further include an instruction for:
   obtaining virtual space information including at least information indicating the virtual object,
   wherein, based on the line-of-sight information and a position of the virtual object indicated by the virtual space information, the closer the position of the virtual object that is gazed at to the line-of-sight of the user, the greater a value is determined for the degree of gaze.

11. The image processing apparatus according to claim 1, wherein the one or more programs further include an instruction for:
  obtaining posture information indicating a posture of the user,
  wherein the degree of gaze is determined and obtained as the degree information based on the posture information.

12. The image processing apparatus according to claim 11, wherein information indicating a change in posture of the user is obtained based on the posture information and the greater an amount of change of the change in posture, the lesser a value is determined for the degree of gaze.

13. The image processing apparatus according to claim 1, wherein the one or more programs further include instructions for:
  generating the display image; and
  outputting information indicating the display image,
  wherein the display image including an image corresponding to the appearance of the virtual object from the virtual camera is generated.

14. The image processing apparatus for displaying a display image including at least an image corresponding to an appearance of a virtual object from a virtual camera to a head mounted display, the image processing apparatus comprising:
  one or more hardware processors; and
  one or more memories storing one or more programs configured to be executed by the one or more hardware processors, the one or more programs including instructions for:
    obtaining degree information indicating a degree of gaze for the virtual object of a user wearing the head mounted display;
    changing a position of the virtual camera in an optical axis direction of the virtual camera based on the degree information; and
    obtaining data of a captured image obtained by image capturing by an imaging device,
  wherein the display image including an image corresponding to the appearance of the virtual object from the virtual camera is generated, and the display image is generated by selectively switching one of a plurality images to another, which at least includes a virtual image corresponding to an appearance of a virtual space from the virtual camera, in which the virtual object is arranged, and a mixed image in which a captured image obtained by image capturing by an imaging device is overlapped by an image corresponding to an appearance of the virtual object from the virtual camera.

15. The image processing apparatus according to claim 13, wherein the one or more programs further include an instruction for:
  obtaining a display state of the head mounted display,
  wherein the display image is generated by selectively switching one of a plurality of images to another in accordance with the display state.

16. An image processing method for displaying a display image including at least an image corresponding to an appearance of a virtual object from a virtual camera to a head mounted display, the image processing method comprising the steps of:
  obtaining degree information indicating a degree of gaze for the virtual object of a user wearing the head mounted display;
  changing a position of the virtual camera in an optical axis direction of the virtual camera based on the degree information;
  selectively switching one of a plurality images to another, which at least includes a virtual image corresponding to an appearance of a virtual space from the virtual camera, in which the virtual object is arranged, and a mixed image in which a captured image obtained by image capturing by an imaging device is overlapped by an image corresponding to an appearance of the virtual object from the virtual camera, and causing the head mounted display to display the image as the display image; and
  changing the position of the virtual camera in the optical axis direction based on the degree information in a case when the plurality of images is switched selectively.

17. A non-transitory computer readable storage medium storing a program for causing a computer to perform a control method of controlling an image processing apparatus for displaying a display image including at least an image corresponding to an appearance of a virtual object from a virtual camera to a head mounted display, the control method comprising the steps of:
  obtaining a degree information indicating a degree of gaze for the virtual object of a user wearing the head mounted display;
  changing a position of the virtual camera in an optical axis direction of the virtual camera based on the degree information;
  selectively switching one of a plurality images to another, which at least includes a virtual image corresponding to an appearance of a virtual space from the virtual camera, in which the virtual object is arranged, and a mixed image in which a captured image obtained by image capturing by an imaging device is overlapped by an image corresponding to an appearance of the virtual object from the virtual camera, and causing the head mounted display to display the image as the display image; and
  changing the position of the virtual camera in the optical axis direction based on the degree information in a case when the plurality of images is switched selectively.

* * * * *